Patented July 18, 1939

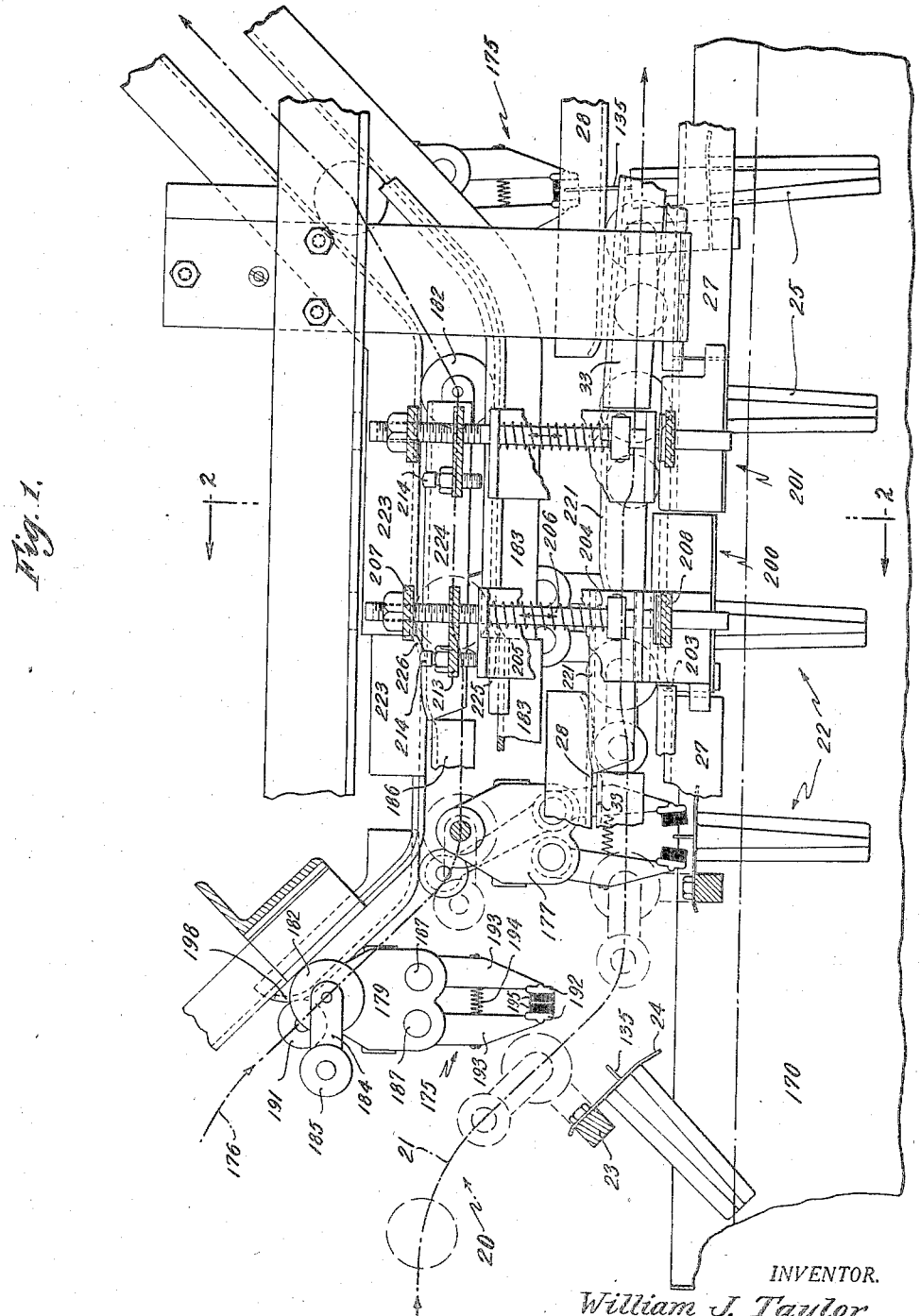

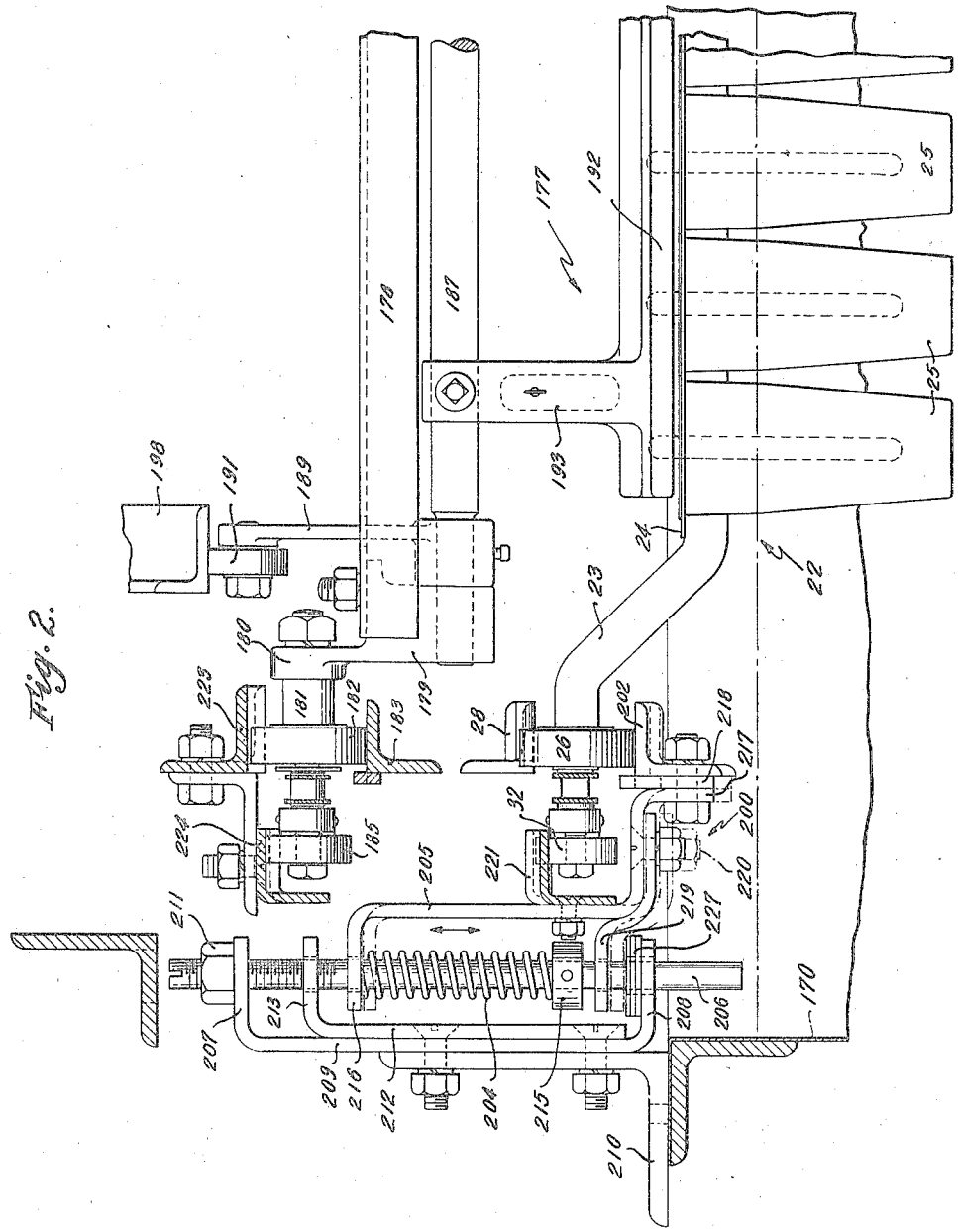

2,166,380

UNITED STATES PATENT OFFICE 2,166,380

MACHINE FOR MAKING FROZEN CONFECTIONS

William J. Taylor, Syracuse, N. Y., assignor to The Lamson Company, Syracuse, N. Y., a corporation of Massachusetts Original application December 13, 1935, Serial No. 54,166. Divided and this application January 15, 1937, Serial No. 120,693

3 Claims. (Cl. 107—8)

This invention relates to an improvement in a machine for making frozen confections, each confection consisting of an edible block with a stick frozen therein and being suitably protected as by means of a bag. The patent to Robb No. 1,960,456, dated May 29, 1934, illustrates a machine of this general type.

This application is a division of application Serial No. 54,166 filed December 13, 1935, which sets forth a machine provided with the instrumentalities by which the following steps are carried out; first, filling each of a plurality of molds with a measured quantity of ice cream or an equivalent edible substance, in a fluid or semi-viscous condition; second, freezing the contents of the molds to form confections; third, inserting a stick into each confection during the freeezing thereof; fourth, heating the walls of the molds sufficiently to permit the withdrawal of the confections therefrom by grippers or similar means; fifth, dipping the confections into a tank by which they are coated with chocolate or similar material; and sixth, inserting the coated confections into bags or cartons.

The object of the invention to which this application is directed resides in the structure and mode of operation of the instrumentality by which the removal of the confections from the molds is performed as will appear from a consideration of the following description and of the drawings which form a part thereof and in which:

Fig. 1 is a side elevation partly in section illustrating the removal of the confections from the molds; and Fig. 2 is a front elevation of one end of the mold and gripper conveyors taken along the line 2—2 in Fig. 1.

The molds 25 containing the confections in which the sticks 135 are frozen fast are advanced into a defrosting tank 170 of warm water to loosen the contact of the frozen solid confections with the sides of the molds. The molds are preferably tapered and may be of any desired cross section being here shown as octagonal. The mold conveyor comprises a pair of side chains 21 (one shown diagrammatically in Fig. 1) between which are supported a plurality of mold carriers 22. Each carrier includes a cross bar 23 having a centrally depressed portion on which is suitably secured a plate 24 having a plurality of openings therein to receive the molds 25. Rollers 26 on the ends of the bars ride, during most of their forward travel, between a track 27 formed by an angular guide beam and a rail 28. Fixed at one end of each cross bar 23 is an arm carrying at its outer end a freely rotatable roller 32. The rollers 32, during portions of the forward travel of the molds, ride against a rail 33, being held in contact therewith by the action of gravity upon the plates 24 and molds 25. The rails 33 are so positioned that the molds enter the tank at a considerable inclination (see Fig. 1) and are heated first at the bottom.

The confections are removed from the molds while in the tank 170 by a gripper conveyor 175, comprising a pair of chains 176 (only one being here shown) between which a plurality of equally spaced gripper carriers 177 are suspended. Each gripper carrier 177 includes a channel cross plate 178 mounted on end blocks 179 from which arms 180 extend upwardly above the cross plate 178. The arms 180 are secured to pins 181 carrying rollers 182 adapted to ride on tracks 183. Fixed to the outer end of one pin 181 is an arm 184 carrying a roller 185 adapted to travel in a channel track 186 mounted on the machine frame adjacent and parallel to one of the tracks 183. A pair of rock shafts 187 are supported at their ends in the blocks 179 below and parallel to the cross plate 178. Intermeshing gears at one end of the shafts insure the unisonal rocking of the shafts in opposite directions. Fixed to the other end of one shaft is an arm 189 which projects upwardly through a slot in the cross plate and carries a roller 191. A pair of gripper jaws 192 are secured by arms 193 to the shafts and are normally held closed by springs 194 attached to the arms. Strips of rubber or similar material 195 are secured to the adjacent faces of the jaws 192.

The conveyor 175 is driven continuously and in unison with the conveyor 20. The gripper carriers 177 of the conveyor 175 are brought into register with the mold carriers 22 of the conveyor 20 as the molds enter the tank 170. A shoe 198 on the machine frame trips the roller 191 of each approaching gripper carrier and holds the jaws open until the carrier is in register with a mold carrier. The jaws are at opposite sides of the sticks 135 and when the roller 191 leaves the shoe 198 the jaws are closed by the springs 194 to seize the sticks.

It will be understood that the sticks are frozen fast in the confections, and that as soon as the confections have been loosened from the molds by the defrosting action of the tank 170 the confections will be removed therefrom by the gripper conveyor. The removal of the confections and molds is facilitated by the provision of float sections 200 and 201 by which the mold conveyor 20 is supported. The float sections are substantially identical and only section 200 will be described in detail. The rollers 26 pass from the tracks 27 onto tracks 202, the forward ends of which are inclined as shown at 203. Each track 202 is yieldably supported upon a spring 204 through an arm 205. The spring 204 surrounds a bolt 206 carried in flanges 207 and 208 of a channeled plate 209. The plate 209 is mounted on a bracket 210 fixed to the machine frame. The bolt 206 is threaded through the opening in the flange 207 and is locked in place by a nut 211. An angle plate 212 is also secured to the bracket 210 and having a bolt receiving hole in its flange 213 further positions the bolt and carries a set screw 214 which limits the upward movement of the arm 205. A collar 215 fixed to the rod supports the lower end of the spring 204. The arm 205 has, at its upper end, a flange 216, having a hole therein through which the bolt passes freely and resting on the upper end of the spring 204, and is bent forwardly and downwardly at its lower end to provide a flange 217. The track 202 and a guard plate 218 are bolted to the flange 217. The arm 205 is further supported by an arm 219, having at one end a hole through which the bolt 204 passes and secured at the other end to the arm 205 by a nut and screw assembly 220. The rails 28 for the rollers 26 of the mold conveyor are broken away at the float sections (see Fig. 1). Fixed to the arm 205 is a bracket providing a rail 221 for the roller 32 of the mold conveyor, the rails 33 elsewhere carried by the rails 28 being also broken away. Mounted on the machine frame in any suitable way are the tracks 183 and rails 223 for the rollers 182 of the gripper conveyor and rails 224 for the rollers 185 thereof. The levels of the tracks 183 and the rails 223 are raised beginning at the float section 200 the levels, as shown in Fig. 1, being connected by inclines 225 and 226.

As the mold conveyor advances a mold carrier to the floating sections, the molds are in the tank 170 so that the confections therein are partially loosened from the walls of the molds and the sticks frozen in the confections have been seized by the jaws of the gripper conveyor which moves in unison with the mold conveyor. The tracks 202 of the float sections being normally raised by the springs 204, the mold carrier is raised as the rollers 26 reach the inclined tips 203 of the tracks 202 and at substantially the same time the gripper jaws are raised by the inclines 225 of the tracks 183. The weight of the mold carrier 22 is sufficient to counteract the tension of the springs 204 but so long as the confections are frozen to the walls of the molds the carriers are supported by the hold of the gripper jaws on the sticks. As soon, however, as the confections have been loosened from the molds the weight of the mold carrier is free to return the tracks 202 to the lower level in alignment with the tracks 27. This usually does not take place until the mold carrier is on the second floating section 201 a condition illustrated in Fig. 1. If it should have taken place while the mold carrier was on section 200 the second section, when the carrier arrived thereon, would at once be lowered by the weight of the carrier from its normal raised position.

The set screws 214 which determine the upper limit of movement of the float sections may be adjusted to insure proper separation of the confections and molds. Pads 227 on the flanges 208 serve as bumpers and determine the lower limit of movement. It will be noted that the level of the rail 224 is the same over the float sections as before and since the rollers 182 have been raised the rollers 185 tilt gripper jaws to facilitate the separation of the confections and the molds. The mold carriers are also tilted by the downwardly inclined rail 33 and the rollers 32 to further facilitate such separation. The paths of travel of the mold and gripper conveyors diverge as they leave the floating section and the confections are thus completely withdrawn from the molds.

I claim:

1. In a machine of the class described comprising a continuously moving conveyor provided with a plurality of molds adapted to contain frozen confections of edible material from which sticks project, means for loosening the confections in the molds and means for removing such loosened confections therefrom, both said means operating while the conveyor is in motion, and said last-named means including float sections provided with tracks on which the mold carriers are supported and means for seizing the sticks, the weight of the carriers causing the tracks of the float sections to lower and separate the molds from the confections.

2. In a machine of the class described comprising a continuously moving conveyor provided with a plurality of molds adapted to contain frozen confections of edible material from which sticks project, means for loosening the confections in the molds and means for removing such loosened confections therefrom, both said means operating while the conveyor is in motion, said first-named means including a heating tank through which the molds are carried by the conveyor, and said last-named means including float sections provided with tracks on which the mold carriers are supported as the molds are in the tank, and a conveyor provided with gripper carriers, the grippers being adapted to seize the sticks of the confections while the mold carriers are on the tracks whereby upon loosening of the contact the weight of the mold carriers lowers the tracks of the float sections with the carriers thereon and the confections are removed from the molds.

3. In a machine of the class described, a conveyor provided with mold carriers each carrier including a plurality of molds adapted to contain confections having sticks projecting therefrom, a second conveyor provided with gripper carriers, means for advancing both conveyors continuously and in unison along paths of travel which are in part parallel, floating tracks on which the mold carriers of the first conveyor are supported during that part of its travel and means for causing the grippers of the second conveyor to seize the sticks of the confections while the mold carriers are on such tracks, the contact of the confections and the walls of the molds being loosened as the weight of the mold carriers lowers the tracks with the carriers thereon and thereby separates the molds from the confections seized by the grippers.

WILLIAM J. TAYLOR.